UNITED STATES PATENT OFFICE.

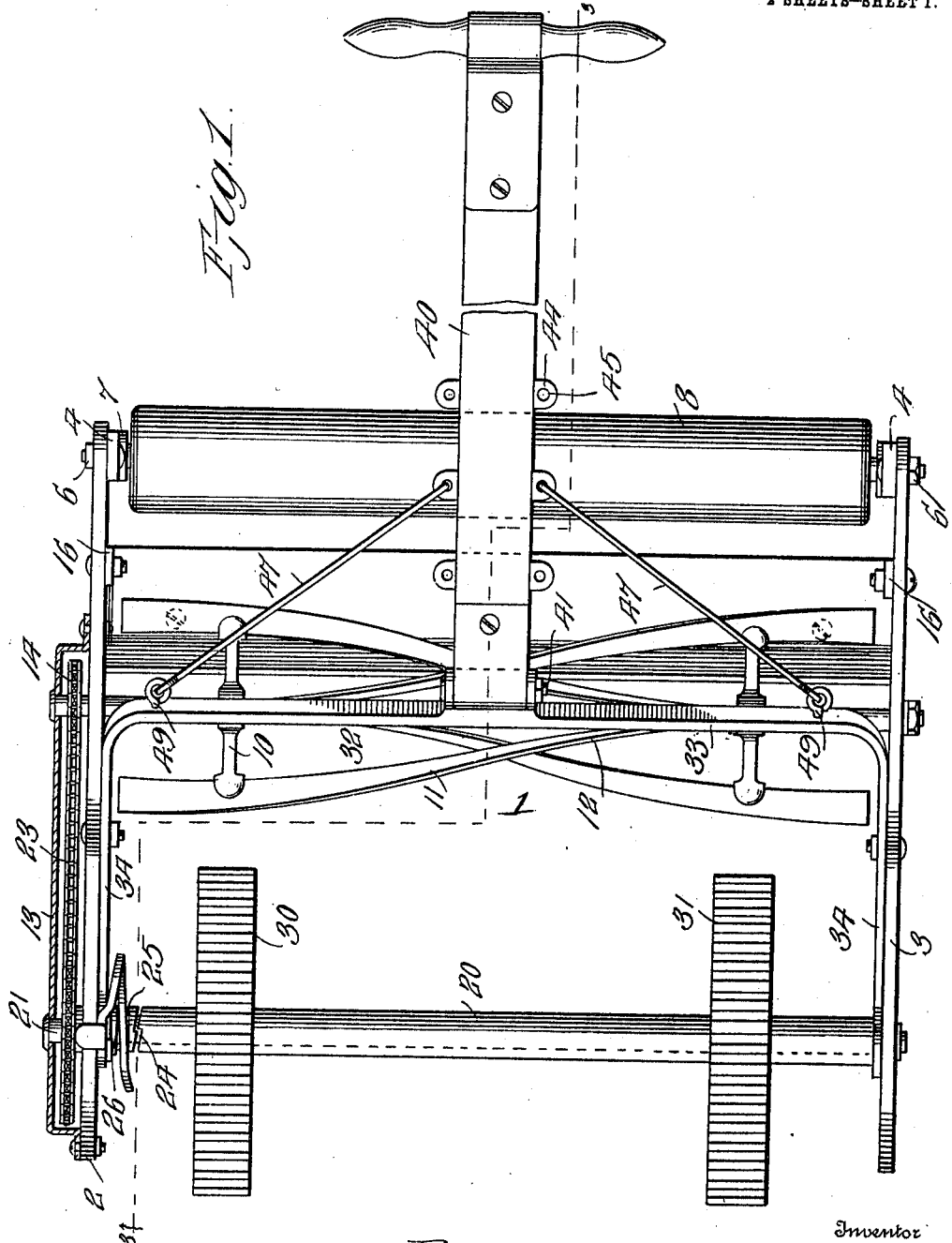

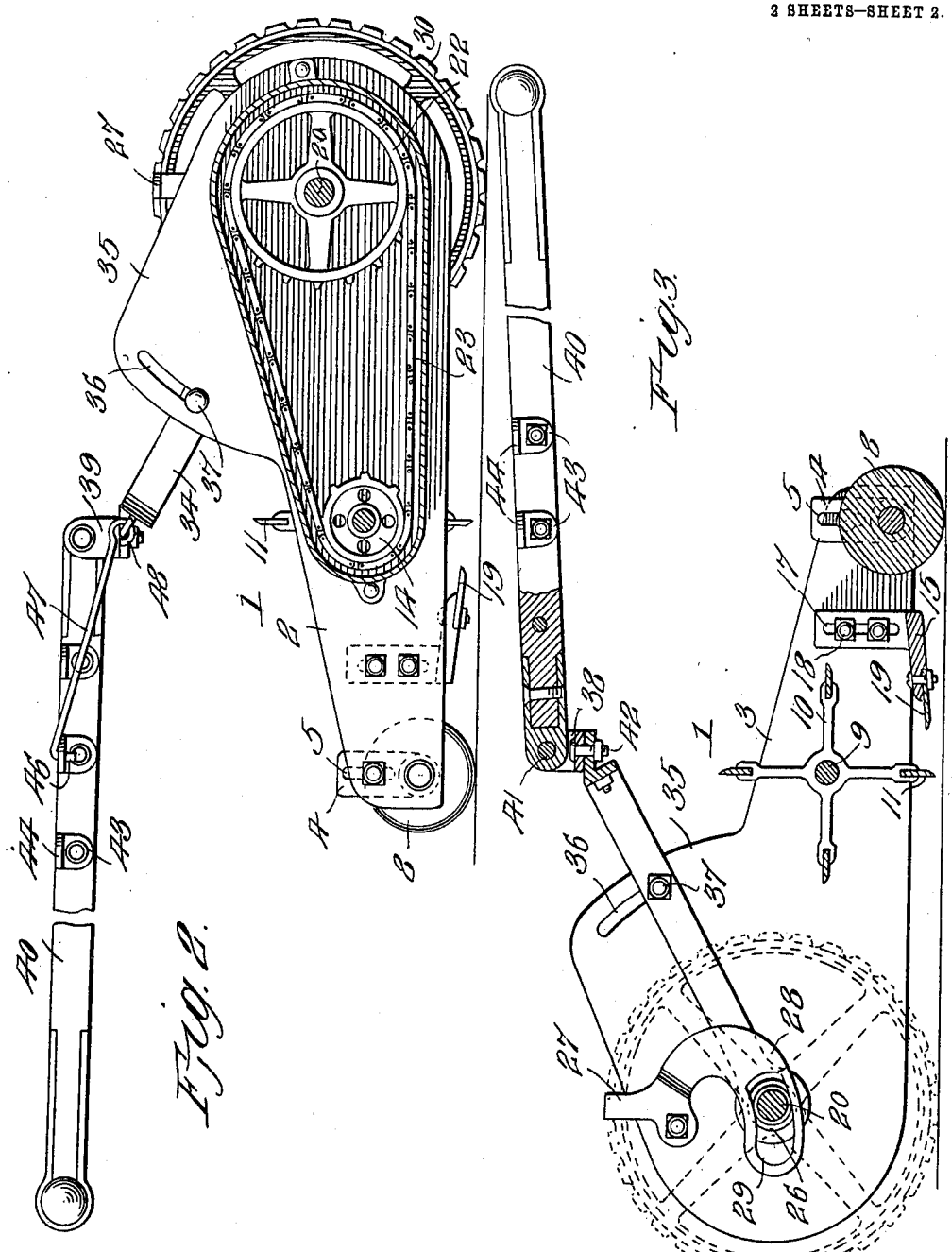

PERCY CLIFTON PETRIE, OF SIMONS, CALIFORNIA.

LAWN-MOWER.

980,121.  Specification of Letters Patent. Patented Dec. 27, 1910.

Application filed April 12, 1910. Serial No. 554,980.

*To all whom it may concern:*

Be it known that I, PERCY CLIFTON PETRIE, a citizen of the United States, residing at Simons, in the county of Los Angeles and State of California, have invented new and useful Improvements in Lawn-Mowers, of which the following is a specification.

This invention relates to lawn mowers and has for an object to provide a machine of this character in which the traction wheels upon the driven axle, are located forwardly of the cutting knives and inwardly of the ends of the knives to enable the latter to cut around obstructions, that is, trees or the like and to cut clear to the edge of a lawn.

A further object of the present invention is to provide novel means for throwing the cutting knives into and out of operation to allow the machine to travel without great resistance or possible damage to the cutting knives when the machine is being drawn from place to place when not in use.

A further object of this invention is to provide an adjustable handle which may be adjusted in a vertical plane to accommodate operators of different heights, and to also provide means whereby the handle can be swung in a horizontal plane to effectively enable the machine to travel upon terraces or like places.

Other objects and advantages will be apparent as the nature of the invention is better set forth, and it will be understood that changes within the specific scope of the claim may be resorted to without departing from the spirit of the invention.

In the drawings forming a portion of this specification, and in which like numerals of reference indicate similar parts in the several views, Figure 1 is a top plan view partly in section of the lawn mower, Fig. 2 is a side view with parts in section, Fig. 3 is a longitudinal sectional view on the line 3—3 of Fig. 1.

Referring now more particularly to the drawings, there is shown a lawn mower 1 comprising parallel spaced side members 2 and 3 which support brackets 4 at their rear ends, and these brackets are preferably provided with elongated vertically disposed slots 5 for receiving clamping bolts 6. The brackets are provided with bearing boxes or bosses 7 for receiving trunnions at the ends of the usual roller 8 which extends at right angles to the members 2 and 3 and transversely of the machine, as shown.

A horizontally disposed shaft 9 is journaled at its ends in the members 2 and 3 of the machine, and this shaft is provided with radial arms 10 for supporting transversely disposed cutting blades 11 which are preferably provided with beveled outer edges 12. The shaft 9 at one end extends outwardly or beyond the outer surfaces of the member 2 and into a longitudinally disposed casing 13 carried by the said member 2. The shaft 9 upon the said outwardly extending portion is provided with a sprocket wheel 14 for a purpose to be hereinafter described. Located rearwardly of the shaft 9 is shown a horizontally disposed member 15 provided at its ends with upstanding ears 16 in which are formed vertically disposed elongated slots 17 for receiving clamping bolts 18 engaged with the side members 2 and 3 and, as will be understood, it is obvious that this member 15 is mounted for movement in a vertical plane. The member 15 has removably mounted upon its under side a blade 19 adapted for coöperation with the blades or knives 11 to effect a perfect cut when the machine is in operation.

Adjacent to the front end of the machine, a drive shaft 20 is shown having its ends mounted in the side members 2 and 3, and at the end adjacent to the member 2, the shaft is extended into the casing 13 as shown at 21. The shaft 20 adjacent to the member 2 is provided with a clutch element 24 adapted to be engaged by a sliding clutch element 25 mounted upon the shaft 20. The clutch element 25 is provided with a sprocket 22, and this sprocket and the sprocket 14 receive a drive chain 23, as shown. The element 25 is provided with an annular groove 26, and the member 2 is provided with a pivoted lever 27 for operating the element 25. The lever 27 is provided with a curved depending finger 28 disposed somewhat at an angle as shown in Fig. 1 of the drawings and in which is formed an arcuate slot 29 to receive the element 25 as will be apparent upon reference to Fig. 3 of the drawings. The shaft 20 is provided with traction wheels 30 and 31, each wheel being located inwardly of each end of the cutting blade, and from this construction it will be seen that when the machine is in operation the knives 11 are adapted to cut their full length and can effectively be operated around obstacles, such as trees or like objects.

A yoke 32 carried by the machine, has a horizontally disposed portion 33 and angularly disposed leg members 34 which are loosely mounted at their lower ends upon the shaft 20 adjacent to the ends thereof and inwardly of the members 2 and 3. The members 2 and 3 are preferably provided with upstanding enlargements 35 in which are formed arcuate slots 36 for receiving clamp bolts 37 in order that the yoke may be held angularly adjusted. A bracket 38 is pivotally mounted upon the portion 33 of the yoke and is provided with spaced ears 39 for receiving the forward end of a handle 40, the handle being mounted preferably upon a bolt 41 having its ends secured in the ears 39 of the bracket in order that the handle may be moved in a vertical plane to accommodate its use to operators of different heights. The pivot 42 for the bracket 38 is such that the said bracket may be rotated horizontally. The handle 40 is provided at the sides thereof with a plurality of spaced brackets 43 having lateral ears 44 in which are formed passages 45 for receiving hooked ends 46 of brace rods 47. The brace rods have eyes 48 formed at their outer ends adapted to be engaged with eye bolts 49 upon the yoke 32. Upon reference to Fig. 1 of the drawings it will be seen that the rods 47 are engaged with the brackets in a manner that the handle 40 is held against horizontal movement, and from the previously described construction of the brackets and brace rods, it is obvious that the said rods may be engaged with various other brackets to hold the handle out of a parallel plane with respect to the members 2 and 3 of the machine in order that the latter may be moved upon terraces while its operator is located upon a plane surface.

Having thus described the invention, what is claimed as new, is:—

A lawn mower comprising parallel side members, a roller revolubly supported by the members at the rear ends thereof, a cutting knife revolubly mounted in the members and located at a point forwardly of the said roller, a drive shaft located forwardly of the cutting knife and provided with fixed traction wheels which are disposed inwardly of the ends of the cutting knife, a clutch member formed at one end of the shaft, a sliding clutch member movably mounted on the shaft, a sprocket gear wheel supported by the said second clutch member, a sprocket gear wheel supported by the cutting knife, a drive chain connecting the said sprocket wheels with each other, a controlling lever for the second clutch member, a yoke pivotally mounted on said parallel members, a bracket pivotally mounted on the yoke, an adjustable handle adjustably supported by the bracket, and connections between the yoke and the handle for holding the handle in its adjusted position.

In testimony whereof I affix my signature in presence of two witnesses.

PERCY CLIFTON PETRIE.

Witnesses:
 IVAN A. MASTERSON,
 WALTER NEVILLE.